United States Patent
Quinn et al.

(10) Patent No.: US 8,793,676 B2
(45) Date of Patent: Jul. 29, 2014

(54) VERSION-RESILIENT LOADER FOR CUSTOM CODE RUNTIMES

(75) Inventors: Thomas E. Quinn, Seattle, WA (US);
Richard A. Cook, Kirkland, WA (US);
Michael Shneerson, Redmond, WA (US); David A. Whitechapel, Seattle, WA (US); William A. Robertson, Redmond, WA (US); Pallavi Vajranabhaiah, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1348 days.

(21) Appl. No.: 11/675,584

(22) Filed: Feb. 15, 2007

(65) Prior Publication Data

US 2008/0201568 A1     Aug. 21, 2008

(51) Int. Cl.
  *G06F 9/44* (2006.01)
(52) U.S. Cl.
  USPC .......................................................... 717/163
(58) Field of Classification Search
  None
  See application file for complete search history.

(56) References Cited

U.S. PATENT DOCUMENTS

| | | | |
|---|---|---|---|
| 5,634,114 A | 5/1997 | Shipley | |
| 5,805,899 A | 9/1998 | Evans et al. | |
| 6,006,235 A * | 12/1999 | Macdonald et al. | 707/702 |
| 6,154,878 A | 11/2000 | Saboff | |
| 6,332,168 B1 | 12/2001 | House et al. | |
| 6,347,398 B1 * | 2/2002 | Parthasarathy et al. | 717/178 |
| 6,349,408 B1 * | 2/2002 | Smith | 717/174 |
| 6,546,554 B1 * | 4/2003 | Schmidt et al. | 717/176 |
| 6,654,762 B2 * | 11/2003 | Cheng et al. | 1/1 |
| 6,658,659 B2 | 12/2003 | Hiller et al. | |
| 6,748,591 B1 | 6/2004 | Lewallen | |
| 6,996,832 B2 | 2/2006 | Gunduc et al. | |
| 2002/0118220 A1 * | 8/2002 | Lui et al. | 345/709 |
| 2003/0187929 A1 * | 10/2003 | Pugh et al. | 709/205 |
| 2004/0019887 A1 | 1/2004 | Taylor et al. | |
| 2004/0187105 A1 * | 9/2004 | Inada | 717/174 |
| 2006/0101468 A1 * | 5/2006 | Massarenti et al. | 718/102 |
| 2006/0200817 A1 | 9/2006 | Callender | |

OTHER PUBLICATIONS

"Version Control with Shared Libraries," HP-UX Linker and Libraries User's Guide: HP 9000 Computers, Chapter 5 Creating and Using Libraries, © 1997 Hewlett-Packard Development Company, L.P., http://docs.hp.com/en/B2355-90655/ch05s08.html, [last accessed Dec. 26, 2007].

(Continued)

*Primary Examiner* — Li B Zhen
*Assistant Examiner* — Lenin Paulino
(74) *Attorney, Agent, or Firm* — Kevin Sullivan; Brian Haslam; Micky Minhas

(57) ABSTRACT

A method and system for dynamically identifying and loading a version of a runtime for custom code of a host application without modifying the host application is provided. A loading system dynamically identifies the version of the runtime during execution of the host application. The loading system is also dynamically linked into the host application so that its algorithm for identifying the version of the runtime can be modified without modifying the host application. When requested by the host application to load custom code, the loading system identifies a version of the runtime to load, loads the identified version of the runtime, and then requests a load component of the loaded version of the runtime to load the custom code.

14 Claims, 4 Drawing Sheets

(56) References Cited

OTHER PUBLICATIONS

Eisenbach, Susan et al., "Keeping Control of Reusable Components," 2nd International working conference on component deployment, e-science Institute, Edinburgh, Scotland, May 2004, Springer-Verlag.

Whitechapel, Andrew, "Microsoft Visual Studio 2005 Tools for the 2007 Microsoft Office System Beta—Design," Sep. 2006, © 2006 Microsoft Corporation.

\* cited by examiner

VERSION-RESILIENT LOADER FOR CUSTOM CODE RUNTIMES

BACKGROUND

Developers of many application programs ("applications") implement the applications so that they can be customized by third parties. To customize an application, a third party develops custom code (e.g., addins and document-level customizations) that uses functionality exposed by the application. The custom code may improve the usability of the applications or provide additional functionality (e.g., domain-specific functionality). Such applications are referred to as "host applications" because the custom code is hosted within the process of the application. Developers of applications typically want to encourage the development of custom code for their applications to increase the demand for their applications. As a result, such developers may provide "runtimes" that facilitate the development of custom code. A runtime is code that is loaded along with custom code and provides services to the custom code. These services may include higher-level functionality than exposed by the application or may include domain-specific functionality. When an application is to load and start the execution of custom code, the application may load the runtime and direct the runtime to load and start the execution of the custom code.

Because of the ease of developing custom code as "managed code," many applications support the execution of custom code in the .NET Framework provided by Microsoft Corporation. The .NET Framework provides a common language runtime ("CLR") that provides high-level operating system type services to the managed programs (including custom code and applications) and serves as an execution engine for managed programs. The CLR ensures that managed programs do not take any unauthorized action. As such, the CLR acts as a "sandbox" within which managed programs execute. The CLR provides application domains ("appdomains") in which different managed programs can execute to help ensure that an errant managed program will not unduly affect the execution of another managed program.

When an application starts, it may identify the custom code that is to be loaded and executed. The application may access registry entries that identify the custom code. When the application identifies custom code, it typically uses a loader object to load and start the execution of the custom code. The application may instantiate the loader object and may then invoke a load method of the loader object to effect the loading of the identified custom code. The loader object loads the runtime for the application and then directs the runtime to load the custom code. The application instantiates a loader object of a loader object class that is defined at compile time. Because the class is specified at compile time, the specific runtime or version of the runtime is effectively hard-coded into the application. This hard-coding of the version of the runtime presents several problems. An application and its runtime may be developed by different groups of developers, may be packaged as different products, and may have different release cycles for their versions. Because of the hard-coding, an application is typically programmed to load the version of the runtime that was current at the time of the application's release. Organizations, however, may be reluctant to upgrade to the new version of the application until the custom code that it relies upon is tested with the version of the runtime loaded by the application. This reluctance may slow the sales of the new version of the application. Another difficulty arises because a new version of the runtime may be released in between releases of the application. In such a case, the application cannot load custom code that relies on the new runtime until a new version of the application with its loader object updated is released or until the application is patched to access the new version of the runtime. Such patching, however, is both expensive and prone to errors.

SUMMARY

A method and system for dynamically identifying and loading a version of a runtime for custom code of a host application without modifying the host application is provided. A loading system dynamically identifies the version of the runtime during execution of the host application. The loading system is also dynamically linked into the host application so that its algorithm for identifying the version of the runtime can be modified without modifying the host application. After the loading system is loaded, it receives from the host application a request to load custom code identified by a custom code identifier. The loading system may then collect custom code information and system information and identify the version of the runtime to load based on that information. The loading system then requests a load component of the loaded version of the runtime to load the custom code identified by the custom code identifier.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
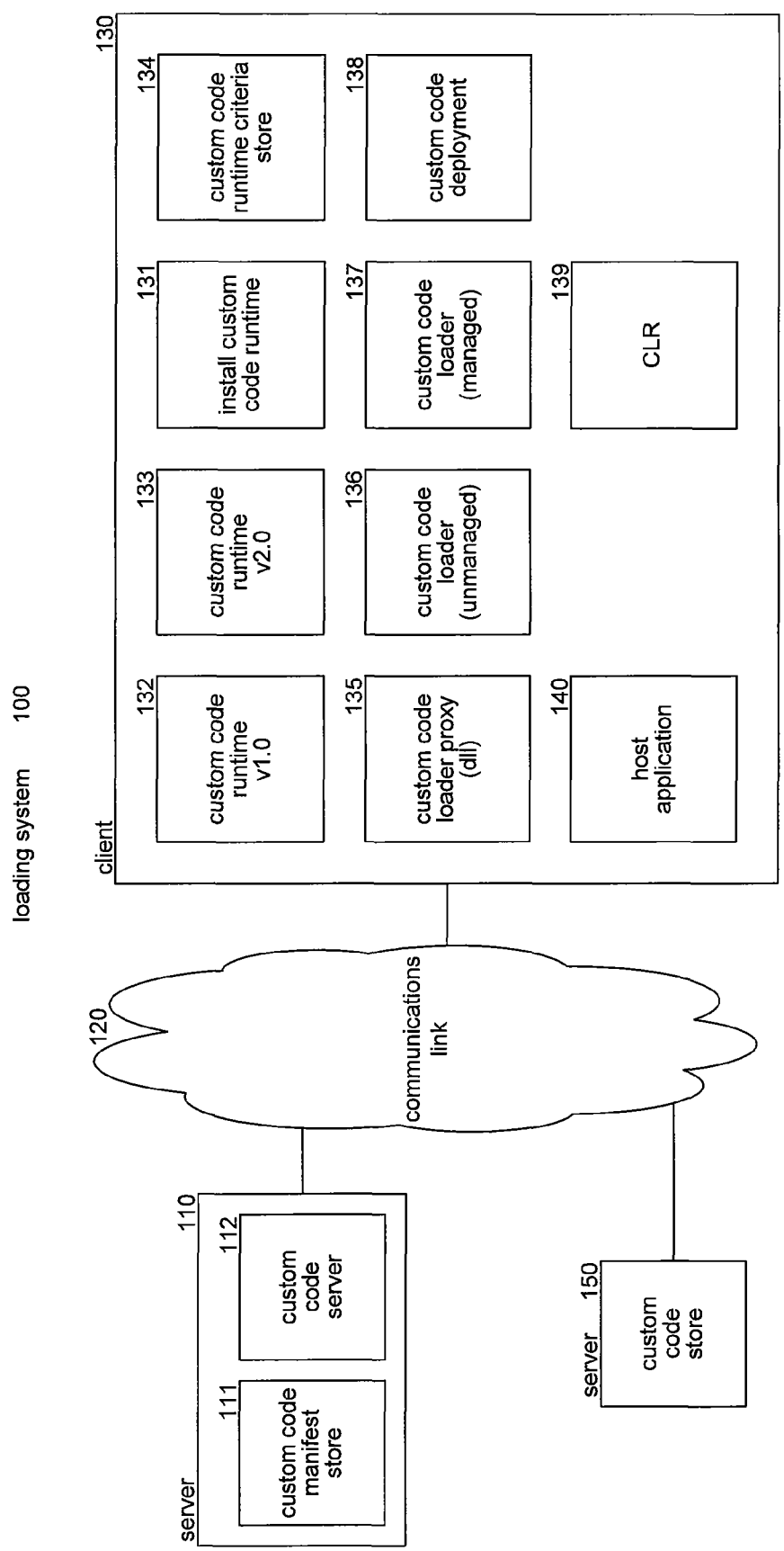
FIG. 1 is a block diagram that illustrates components of the loading system in one embodiment.

A method and system for dynamically identifying and loading a version of a runtime for custom code of a host application without modifying the host application is provided. In one embodiment, a loading system dynamically identifies the version of the runtime during execution of the host application. The loading system is also dynamically linked into the host application so that its algorithm for identifying the version of the runtime can be modified without modifying the host application. After the loading system is loaded, it receives from the host application a request to load custom code identified by a custom code identifier. The host application may retrieve the custom code identifier from a system registry entry that identifies custom code to be loaded by the host application. The loading system may then collect custom code information and system information and identify the version of the runtime to load based on that information. The custom code information may include, for example, a specification of a specific version of the runtime needed by the custom code. The system information may identify the different versions of the runtime that are available to be loaded, indicate which versions of the runtime are compatible with which versions of the host application, identify the version of the operating system, identify the version of the common language runtime, and so on. The loading system then requests a load component of the loaded version of the runtime to load the custom code identified by the custom code identifier. The load component may use a deployment system as described in U.S. application Ser. No. 11/675,591, entitled "Dynamic Deployment of Custom Code," filed concurrently and hereby incorporated by reference. The deployment system dynamically downloads custom code for execution within a host application. The identifier of the custom code may reference a manifest that contains information describing the custom code, its location (e.g., on a server), and other information needed to install, load, and execute the custom code. The manifest may also contain information used by the loading system to identify which version of the runtime to load.

In one embodiment, an implementation of the loading system, also referred to a "custom code loader proxy," is stored in a dynamic-link library so that its algorithm can be modified to identify different versions of the runtime without having to modify the host application. When a new version of the runtime is released, a new implementation of the loading system may also be released with an updated algorithm for identifying what version of the runtime to load. To install the new version of the runtime on a computing system, the installation process overwrites the dynamic-link library with the new implementation of the loading system. The installation process may also update a runtime criteria store that contains information used by the algorithm to identify the version of the runtime to load. The installation process also installs the new version of the runtime on the computing system. When the host application is next executed, it will automatically link in and execute the new version of the loading system, which will identify and load a version of the runtime.

FIG. 1 is a block diagram that illustrates components of the loading system in one embodiment. The loading system 100 may be implemented on a client computing device 130 connected to a server computing device 110 via a communications link 120. The server computing device implements the server side of a custom code deployment system and may include a custom code manifest store 111 and a custom code manifest server component 112. The custom code manifest store contains the manifests of the custom code that has been published to the deployment system. The custom code manifest server component receives requests to publish custom code and requests for manifests of the published custom code. Upon receiving a request for a manifest, the custom code manifest server component retrieves the manifest from the custom code manifest store and provides the retrieved manifest to the requesting computer system. The manifest identifies the location where the custom code is stored, such as in a custom code store at server 150. Alternatively, the loading system may be used in an environment where custom code is not dynamically deployed by a deployment system. In such an environment, the custom code can be installed on the client computing system using static installation techniques.

The client computing device includes an install custom code runtime component 131, custom code runtime versions 132 and 133, and a custom code runtime criteria store 134. The install custom code runtime component controls the installation process of a new custom code runtime and a new custom code loader proxy component 135. The install custom code runtime component also updates the custom code runtime criteria store to specify new criteria for identifying which versions of the runtime to load. When a new version of a runtime is installed, the custom code loader proxy component may not need to update when its algorithm is implemented to automatically recognize all installed versions of the runtime. Whether or not the custom code loader proxy is updated, the installation process may update the custom code runtime criteria store to identify the new version of the runtime. The loading system also includes a custom loader proxy component 135, a custom code loader (unmanaged) component 136, a custom code loader (managed) component 137, and a custom code deployment component 138. A host application 140 invokes the custom code loader proxy component to load the custom code. The custom code loader proxy component identifies a version of the custom code runtime, loads the custom code runtime, starts a common language runtime ("CLR") 139 and invokes a load component of the custom code loader (unmanaged) component of the runtime. The custom code loader (managed) component may use the custom code deployment component to install the custom code specified by its manifest on the server computing system.

The computing devices on which the loading system may be implemented may include a central processing unit, memory, input devices (e.g., keyboard and pointing devices), output devices (e.g., display devices), and storage devices (e.g., disk drives). The memory and storage devices are computer-readable media that may be embedded with computer-executable instructions that implement the loading system. In addition, the instructions, data structures, and message structures may be stored or transmitted via a data transmission medium, such as a signal on a communications link. Various communications links may be used, such as the Internet, a local area network, a wide area network, or a point-to-point dial-up connection.

The loading system may be implemented on various computing systems or devices including personal computers, server computers, multiprocessor systems, microprocessor-based systems, network PCs, minicomputers, mainframe computers, distributed computing environments that include any of the above systems or devices, and the like. The loading system may be used by various computing systems such as personal computers, cell phones, personal digital assistants, consumer electronics, home automation devices, and so on.

The loading system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
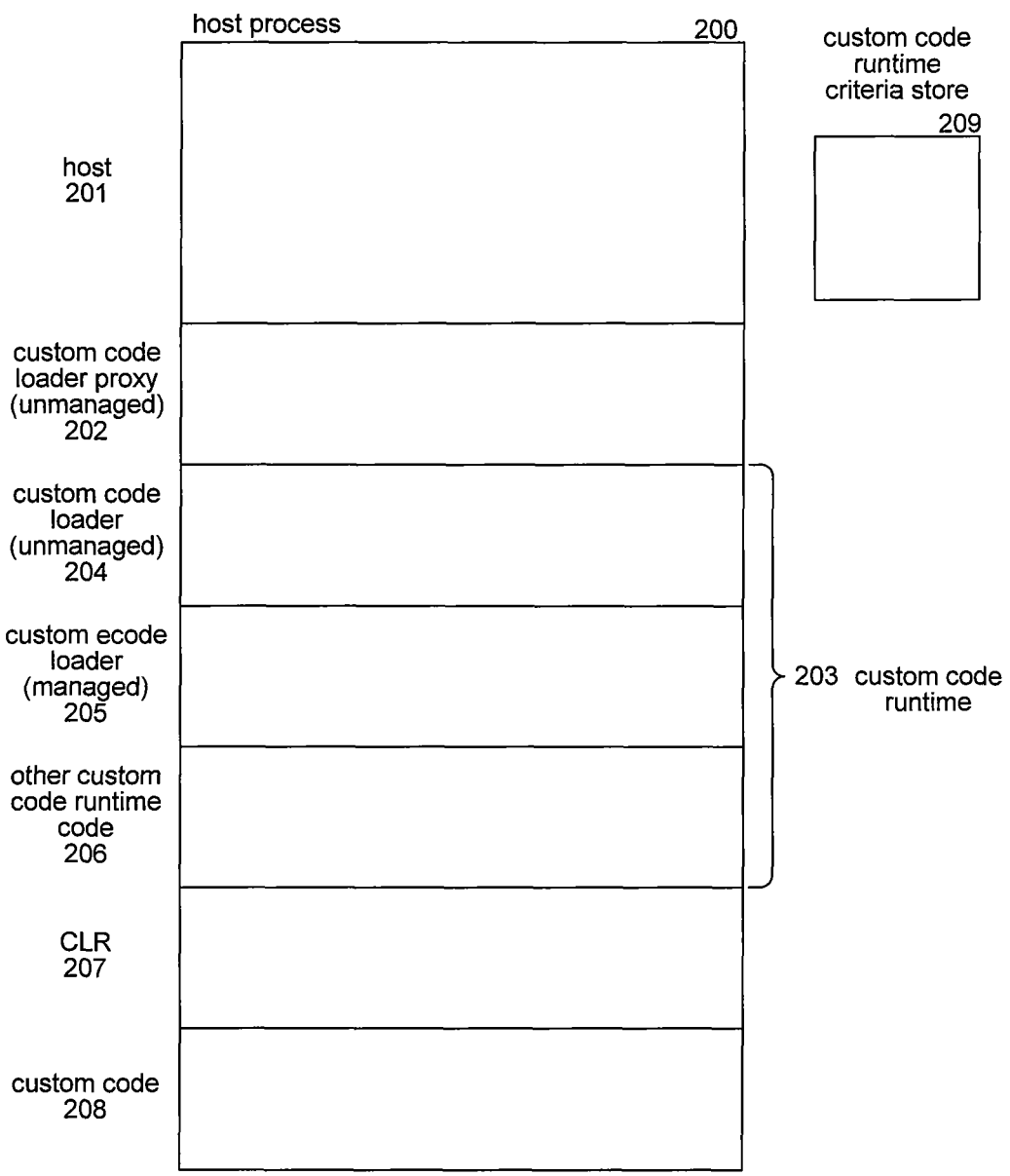
FIG. 2 is a block diagram that illustrates a process layout of a host application in which versions of custom code runtimes can be dynamically identified and loaded.

FIG. 2 is a block diagram that illustrates a process layout of a host application in which versions of custom code runtimes can be dynamically identified and loaded. A host process 200 includes host code 201 that implements the primary behavior of the host application. When the host code desires to load and execute custom code, the host code instantiates a custom code loader proxy object 202. The implementation of the custom code loader proxy object may be stored in a dynamic-link library as unmanaged code. The host code then invokes a load function of the custom code loader proxy object. The load function identifies the appropriate version of the custom code runtime that should be loaded for the custom code that is to be loaded. The load function may identify the appropriate version based on information stored in a custom code runtime criteria store 209 and other information such as version of the operating system, attributes of the custom code, and so on. The load function loads the appropriate version of the custom code runtime 203, which includes a custom code loader (unmanaged) object 204, a custom code loader (managed) object 205, and other custom code runtime code 206. The load function then invokes the load function of the custom code loader (unmanaged) object. The load function of the custom code loader (unmanaged) object then initializes a common language runtime ("CLR") 207. The load function of the custom code loader (unmanaged) object then invokes a load function of the custom code loader (managed) object to load custom code 208. After the custom code is loaded, the host code interacts directly with the custom code bypassing the custom code loader proxy object.

Figure 3:
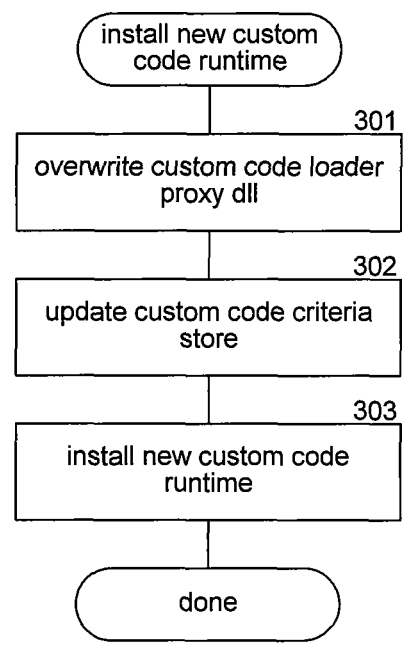
FIG. 3 is a flow diagram that illustrates the process of installing a new custom code runtime on a computing system in one embodiment.

FIG. 3 is a flow diagram that illustrates the process of installing a new custom code runtime on a computing system in one embodiment. In block 301, the installation process overwrites the existing custom code loader proxy stored in a dynamic-link library with the new custom code loader proxy. The new custom code loader proxy is programmed to load the new custom code runtime or a previous custom code runtime as appropriate. Because the installation overwrites the existing custom code loader proxy, the computing system will not have multiple copies of the custom code loader proxy. In block 302, the installation process updates the custom code runtime criteria store so that the new custom code loader proxy can identify the appropriate version of the custom code runtime. In block 303, the installation process then installs the new custom code runtime using techniques that may be conventional. Upon completion of the installation, the computing system may have multiple versions of the custom code runtime, but it will have only one version of the custom code loader proxy that can be loaded by the host application.

Figure 4:
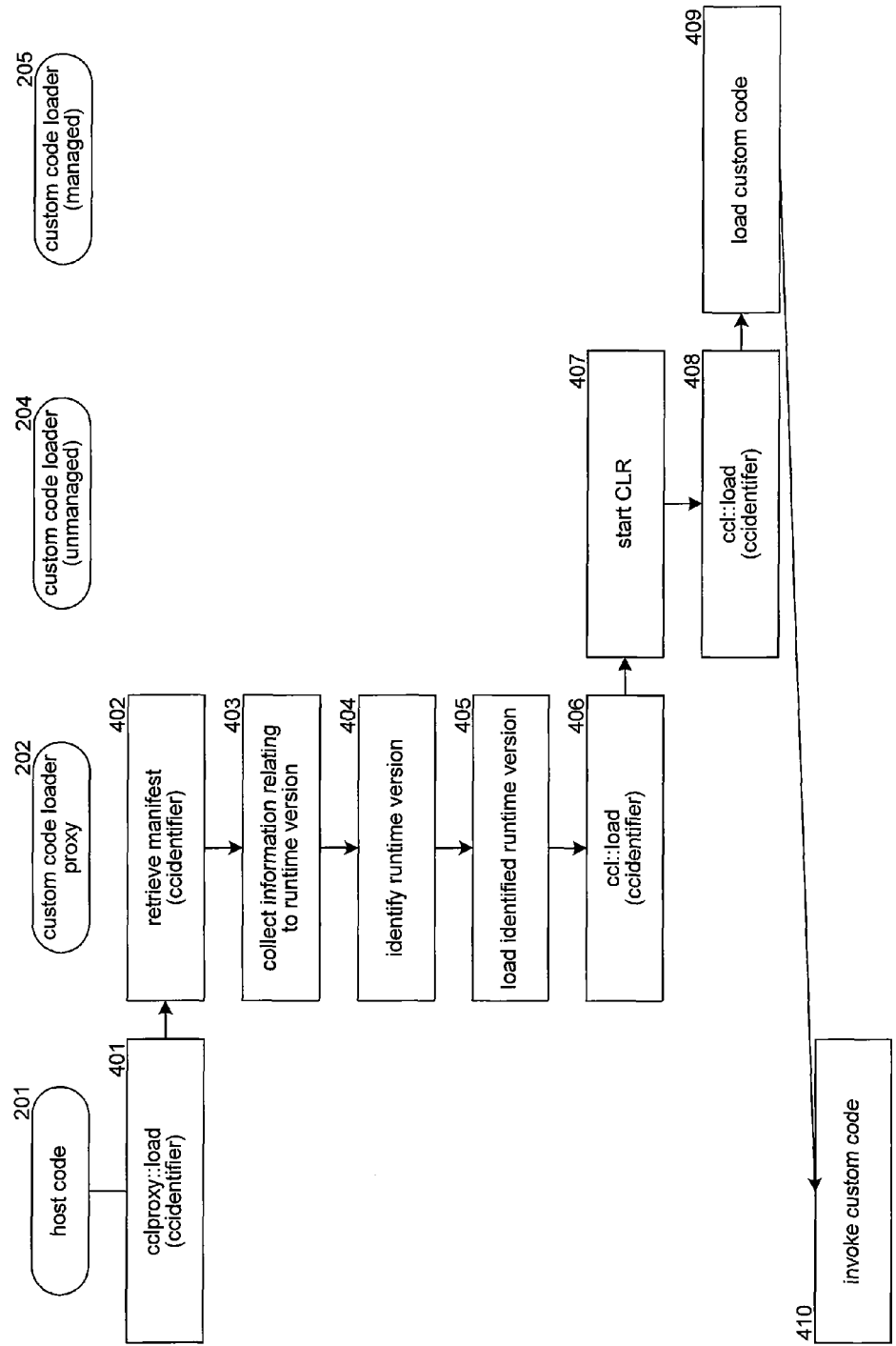
FIG. 4 is a flow diagram that illustrates the process of loading custom code into a host process in one embodiment.

FIG. 4 is a flow diagram that illustrates the process of loading custom code into a host process in one embodiment. In block 401, the host code 201 instantiates the custom code loader proxy object 202 and invokes a load function of the object. In block 402, the load function retrieves the manifest for the custom code, which may contain information that is used to identify the version of the runtime to load. In block 403, the load function collects information needed to identify the appropriate version of the custom code runtime, such as from the custom code runtime criteria store. In block 404, the load function identifies the version of the custom code runtime that should be loaded. The load function may implement various algorithms for identifying the runtime to be loaded. For example, information associated with the custom code to be loaded may indicate that the custom code should execute with a specified version of the runtime. The algorithm may, however, be programmed to identify the latest version of the runtime knowing that the latest version is compatible with the specified version. In block 405, the load function loads the identified version of the custom code runtime by instantiating an object for the class of the identified version. In block 406, the load function invokes a load function of the custom code loader (unmanaged) object 204 of the custom code runtime. In block 407, the load function starts the CLR 207. In block 408, the load function invokes a load function of the custom code loader (managed) object 205 of the custom code runtime. In block 409, the load function of the custom code loader (managed) object loads the custom code. After the custom code is loaded, the custom code runtime returns to the host code. In block 410, the host code invokes the custom code.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Each host application may have its own custom code loader proxy that includes an algorithm for identifying a version of the runtime for that host application. Alternatively, host applications that are included in a suite of applications (e.g., a suite that include a word processing application, a spreadsheet application, and a drawing application) may share the same runtime and thus may share the same custom code loader proxy. Accordingly, the invention is not limited except as by the appended claims.

We claim:

1. A computing system for dynamically identifying and loading a version of a runtime for custom code, the custom code for execution within a host process of a host application, the computing system comprising:
 a memory storing computer-executable instructions of:
  a host application that hosts custom code for execution within the host process; and
  a loader component for execution within the host process that:
   receives from the host application executing within the host process a request to load custom code identified by a custom code identifier;
   executes an algorithm that identifies a version of a runtime for the custom code, the algorithm
    collects system information including information relating to different versions of the runtime that are available to be loaded and executed within the host process; and
    identifies, based on the system information, a version of the runtime to load;
   loads the identified version of the runtime for execution within the host process;
   requests a load component of the loaded version of the runtime to load the custom code identified by the custom code identifier; and
   invokes the loaded custom code for execution within the host process of the host application as hosted custom code so that different runtimes are loaded into the hosted application depending of the version of the runtime needed by each custom code;
  wherein the loader component is dynamically linked to the host application so that the algorithm that identifies the version of the runtime can be modified without modifying the host application and
  wherein the components are stored in a dynamic-link library and
 a processor that executes the computer-executable instructions stored in the memory.

2. The computing system of claim 1 wherein the system information includes operating system information.

3. The computing system of claim 1 wherein the components are implemented using unmanaged code.

4. The computing system of claim 1 including a component that collects custom code information relating to the custom code to be loaded and wherein the component that identifies a version of the runtime performs the identification based on the custom code information.

5. The computing system of claim 4 wherein the custom code information specifies a version of the runtime to load.

6. The computing system of claim 5 wherein the component that identifies overrides the specification of the version by the custom code information when it is determined that a later version of the runtime is compatible with the custom code.

7. The computing system of claim 1 wherein the load component of the runtime dynamically deploys the custom code.

8. The computing system of claim 1 wherein system information specifies compatibility between versions of the host application and versions of the runtime.

9. A computer-readable memory embedded with computer-readable instructions for controlling a computing system to load custom code, the custom code for providing customization of a host application, the custom code using a runtime that supports the customization of the host application, by a method comprising:
- under control of the host application executing within a host process as unmanaged code,
  - loading a custom code loader proxy for execution within the host process of the host application as unmanaged code, wherein the custom code loader proxy is stored in a dynamic-link library; and
  - requesting the loaded custom code loader proxy to load the custom code;
- under control of the custom code loader proxy executing within the host process,
  - identifying a version of the runtime that is compatible with the host application and the custom code to be loaded;
  - loading the identified version of the runtime for execution within the host process; and
  - requesting an unmanaged custom code loader of the loaded runtime to load the custom code;
- under control the unmanaged custom code loader of the runtime executing within the host process as unmanaged code,
  - starting execution of the runtime for execution of managed code;
  - requesting a managed custom code loader of the runtime to load the custom code;
- under control of the managed custom code loader of the loaded runtime executing within the host process as managed code, loading the custom code for execution with the host process as managed code; and
- under control of the custom code executing within the host process as managed code, using services provided by the runtime to effect customization of the host application.

10. The computer-readable memory of claim 9 wherein the identifying is based on compatibility between version of the host application, version of the custom code installed on the computing system, and version of an operating system under which the host application executes.

11. The computer-readable memory of claim 9 wherein a new custom code loader proxy is installed by replacing the dynamic-link library on which is stored an old custom code loader proxy with a dynamic-link library on which is stored the new custom code loader proxy.

12. The computer-readable memory of claim 9 wherein the custom code specifies a version of the runtime.

13. The computer-readable memory of claim 12 wherein the identifying overrides the specification of the version when a later version of the runtime is compatible with the custom code.

14. The computer-readable memory of claim 9 wherein the loading of the custom code includes deploying of the custom code from a server.

* * * * *